United States Patent
Jarmon

(10) Patent No.: US 10,259,518 B2
(45) Date of Patent: Apr. 16, 2019

(54) GARMENTS HAVING MECHANISMS INTEGRATED THEREIN, GRIPPING MECHANISMS, AND METHODS OF USE THEREOF

(71) Applicant: Robert Lee Jarmon, Raleigh, NC (US)

(72) Inventor: Robert Lee Jarmon, Raleigh, NC (US)

(*) Notice: Subject to any disclaimer, the term of this patent is extended or adjusted under 35 U.S.C. 154(b) by 0 days.

(21) Appl. No.: 14/878,677

(22) Filed: Oct. 8, 2015

(65) Prior Publication Data

US 2016/0200386 A1 Jul. 14, 2016

Related U.S. Application Data

(60) Provisional application No. 62/034,856, filed on Aug. 8, 2014.

(51) Int. Cl.
*B62J 27/00* (2006.01)
*A41D 3/00* (2006.01)
*A41D 1/02* (2006.01)

(52) U.S. Cl.
CPC ............... *B62J 27/00* (2013.01); *A41D 1/02* (2013.01); *A41D 3/00* (2013.01); *A41D 2400/80* (2013.01); *A41D 2600/102* (2013.01); *B62J 2027/005* (2013.01)

(58) Field of Classification Search
CPC ... A41D 1/02; A41D 1/04; A41D 3/00; A41D 2400/80; A41S 260/102; B62J 2027/005
USPC ............................................................ 2/97
See application file for complete search history.

(56) References Cited

U.S. PATENT DOCUMENTS

| | | | | |
|---|---|---|---|---|
| 206,620 A | * | 7/1878 | Ryan ............... | A41D 1/04 2/102 |
| 317,693 A | * | 5/1885 | Wilde .............. | A41D 1/04 2/92 |
| 421,520 A | * | 2/1890 | Rosenstock ..... | A41D 1/04 2/115 |
| 614,068 A | * | 11/1898 | Wetzler .......... | A41D 1/04 2/102 |
| 1,091,262 A | * | 3/1914 | Walsh ............. | A41D 27/20 2/250 |
| 1,118,572 A | * | 11/1914 | Nigh ............... | A41D 1/04 2/102 |
| 1,951,240 A | * | 3/1934 | Gold ............... | A41D 1/02 2/93 |
| 2,056,788 A | * | 10/1936 | Hillson .......... | A41D 1/02 2/92 |
| 2,507,322 A | * | 5/1950 | Smith ............. | A41D 3/00 2/270 |

(Continued)

*Primary Examiner* — Shaun R Hurley
*Assistant Examiner* — Bao-Thieu L Nguyen
(74) *Attorney, Agent, or Firm* — Ward and Smith, P.A.; Ryan K. Simmons

(57) ABSTRACT

Garments having gripping mechanisms integrated therein, gripping mechanisms, and methods of use thereof are disclosed. In one example, the garment is a motorcycle vest or motorcycle jacket that includes one or more handgrip pockets integrated therein. In another example, the garment is a motorcycle vest or motorcycle jacket that includes one or more handgrip loops integrated therein. In yet another example, the garment is a motorcycle vest or motorcycle jacket that includes a harness and one or more handgrips integrated therein. In one example, each of the handgrips includes a baseplate, a collapsible handle, and a padded grip.

10 Claims, 7 Drawing Sheets

(56) References Cited

U.S. PATENT DOCUMENTS

| | | | | |
|---|---|---|---|---|
| 2,696,617 | A * | 12/1954 | Worcester | A41D 1/04 2/102 |
| 3,533,107 | A * | 10/1970 | Garbarino | A41D 13/0525 2/93 |
| 3,602,914 | A * | 9/1971 | Castello | A41D 1/04 2/247 |
| 4,554,682 | A * | 11/1985 | Hillquist | A41D 3/00 2/102 |
| 4,771,479 | A * | 9/1988 | Silver | A41D 3/00 2/207 |
| 5,138,716 | A * | 8/1992 | Deuschle | A41D 1/02 2/108 |
| 5,619,751 | A * | 4/1997 | Ray | A41D 13/00 2/102 |
| 6,018,819 | A * | 2/2000 | King | A41D 13/0015 2/69 |
| 6,029,270 | A * | 2/2000 | Ost | A41D 3/00 2/2.5 |
| 6,052,826 | A * | 4/2000 | Tolton | A41D 27/24 2/108 |
| 7,620,998 | B2 * | 11/2009 | Sandoval | A41D 1/04 2/247 |
| 7,784,109 | B2 * | 8/2010 | Seguin | A41D 1/04 2/247 |
| 7,886,368 | B2 * | 2/2011 | Hood | A41D 1/002 2/102 |
| 7,966,667 | B2 * | 6/2011 | Tomlinson | A41D 3/00 2/108 |
| 8,176,569 | B2 * | 5/2012 | Rock | A41D 1/04 2/2.5 |
| 2002/0124296 | A1 * | 9/2002 | Lipsett | A41D 3/02 2/84 |
| 2007/0000030 | A1 * | 1/2007 | Toomey | A41D 27/20 2/247 |
| 2007/0066161 | A1 * | 3/2007 | Luis | A41D 13/00 441/106 |
| 2008/0060112 | A1 * | 3/2008 | Driehorst | A41D 13/015 2/85 |
| 2010/0031415 | A1 * | 2/2010 | Shadid | A41D 13/0012 2/87 |
| 2011/0000009 | A1 * | 1/2011 | Culpepper | A62B 17/00 2/457 |
| 2012/0291179 | A1 * | 11/2012 | Shea | A41D 27/20 2/102 |
| 2013/0047314 | A1 * | 2/2013 | Alvarado, Jr. | A41D 13/0002 2/93 |
| 2013/0067640 | A1 * | 3/2013 | Hefter | A41D 1/06 2/234 |
| 2016/0198778 | A1 * | 7/2016 | Hines | C08K 3/0033 2/269 |
| 2016/0278454 | A1 * | 9/2016 | Lucas | A41D 13/0007 |
| 2016/0331052 | A1 * | 11/2016 | West | A41D 27/02 |

* cited by examiner

GARMENTS HAVING MECHANISMS INTEGRATED THEREIN, GRIPPING MECHANISMS, AND METHODS OF USE THEREOF

CROSS-REFERENCE TO RELATED APPLICATIONS

The presently disclosed subject matter is related to U.S. Provisional Patent App. No. 62/034,856 entitled "Safety device that allows motorcycle passengers to grip to," filed on Aug. 8, 2014; the entire disclosure of which is incorporated herein by reference.

TECHNICAL FIELD

The presently disclosed subject matter relates generally to motorcycle safety and more particularly to a garment having one or more gripping mechanisms integrated therein, the gripping mechanisms themselves, and methods of use thereof.

BACKGROUND

Typically, the passenger on a motorcycle sits behind the driver and wraps his/her arms around the body of the driver. Holding on to the driver's body does not provide a high level of safety for the passenger, as the passenger's grip may easily break away upon any type of disruptive force (e.g., a bump, a curve, a sudden acceleration, and the like). Accordingly, the motorcycle passenger's safety is as risk.

SUMMARY

In some aspects, the presently disclosed subject matter provides a jacket or a vest having one or more gripping mechanisms integrated therein, the jacket or vest comprising a jacket or vest body and one or more gripping mechanisms selected from the group consisting of a pocket (wherein the pocket is inserted backward and downward relative to a normal pocket), a loop, and a handgrip provided on one or more of a front and a back of the jacket or vest body. The jacket or vest is adapted to be worn by a driver of a motorcycle and the one or more gripping mechanisms are adapted to be grasped by the hands or fingertips of a passenger of the motorcycle.

Certain aspects of the presently disclosed subject matter having been stated hereinabove, which are addressed in whole or in part by the presently disclosed subject matter, other aspects will become evident as the description proceeds when taken in connection with the accompanying Examples as best described herein below.

BRIEF DESCRIPTION OF THE DRAWINGS

Figure 1A:
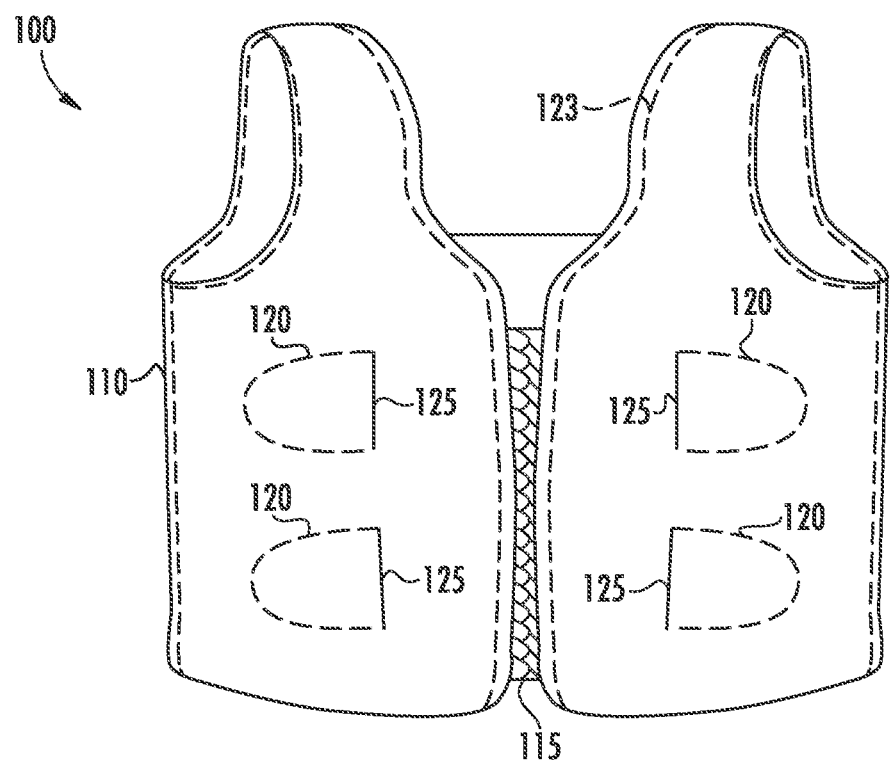
Figure 1B:
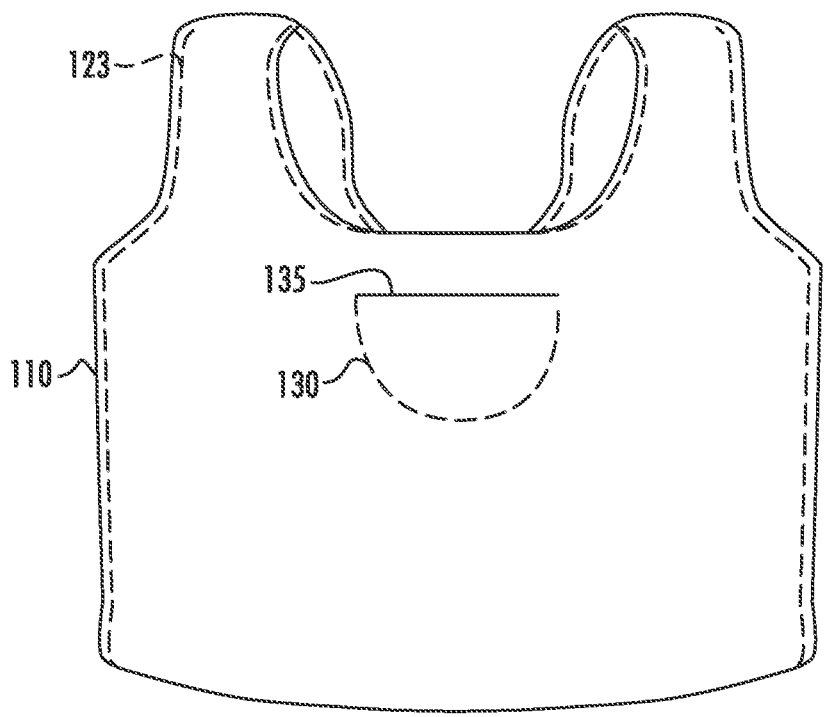
Figure 2B:
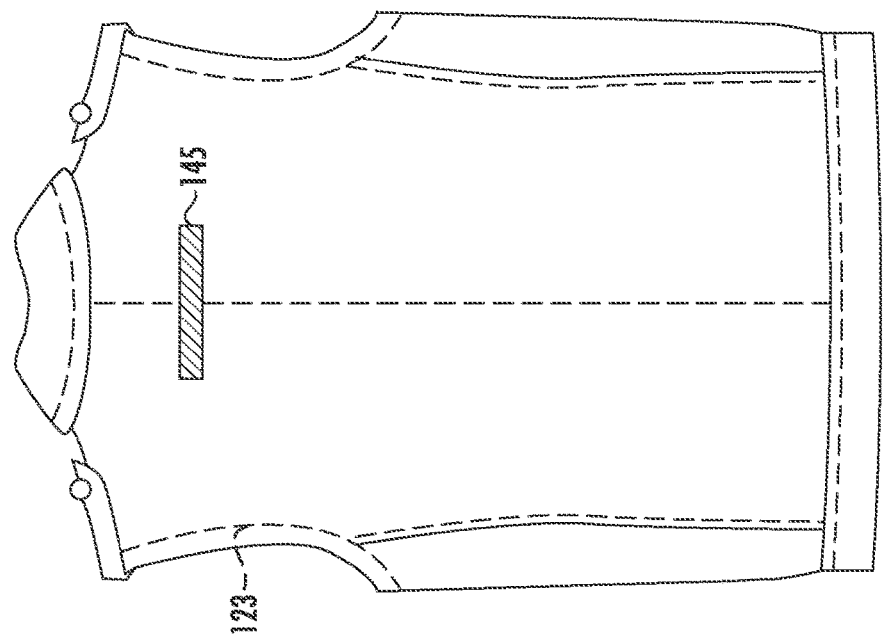
Figure 2A:
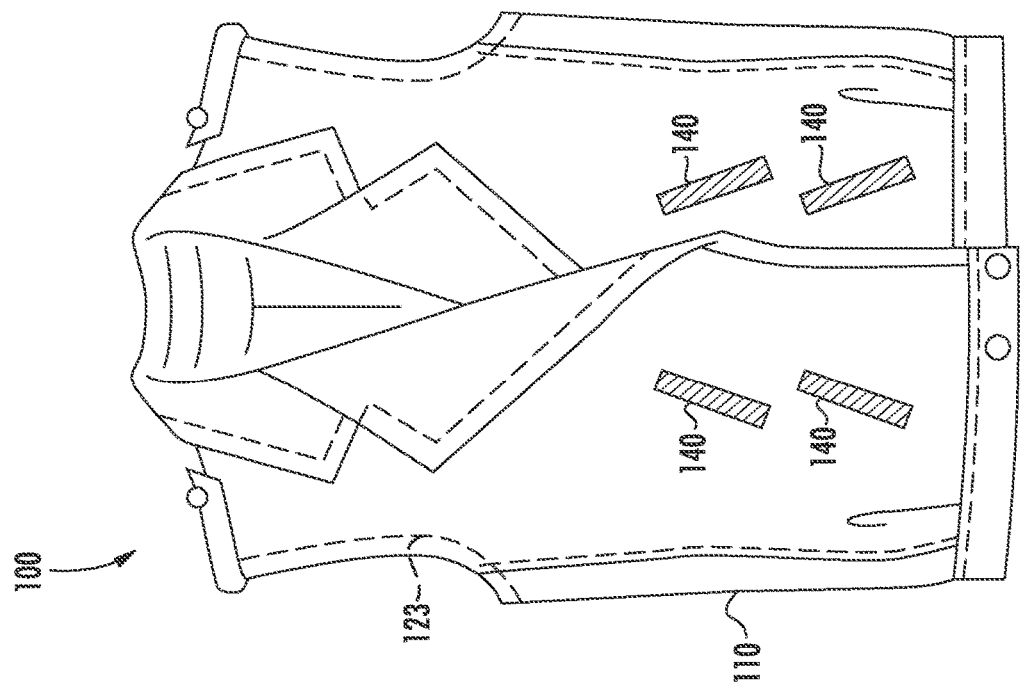
Figure 3:
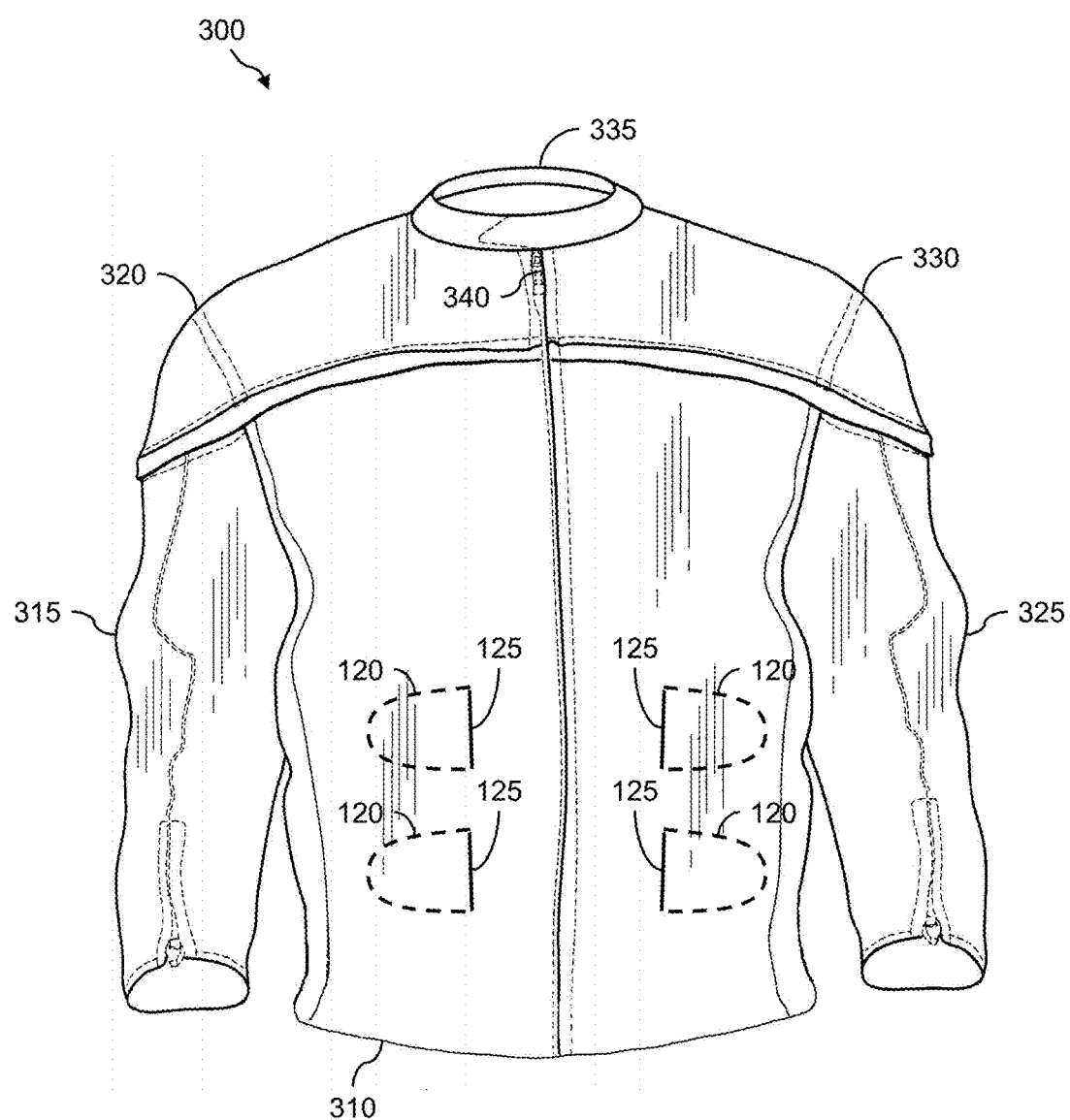
Figure 4:
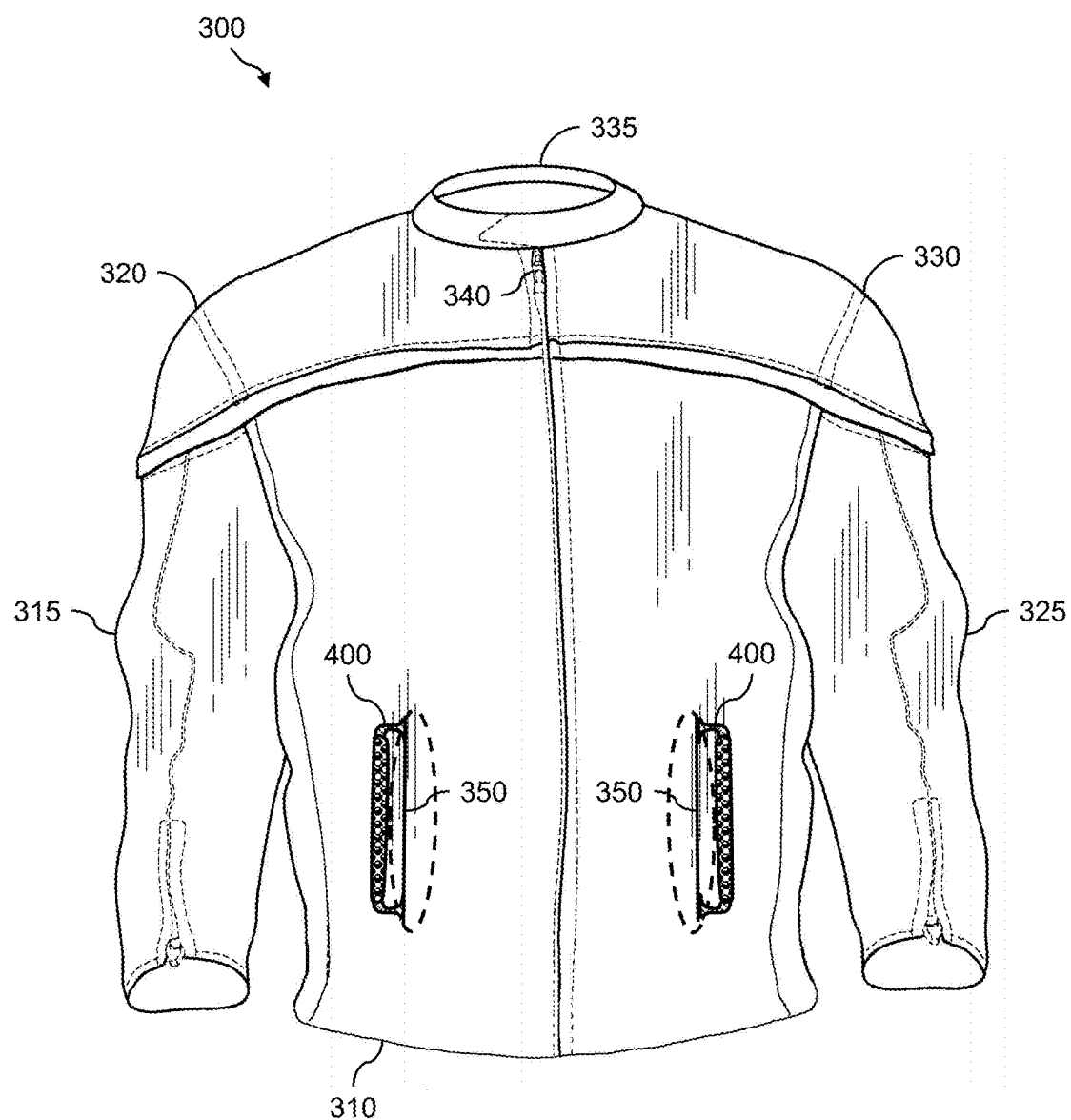
Figure 5:
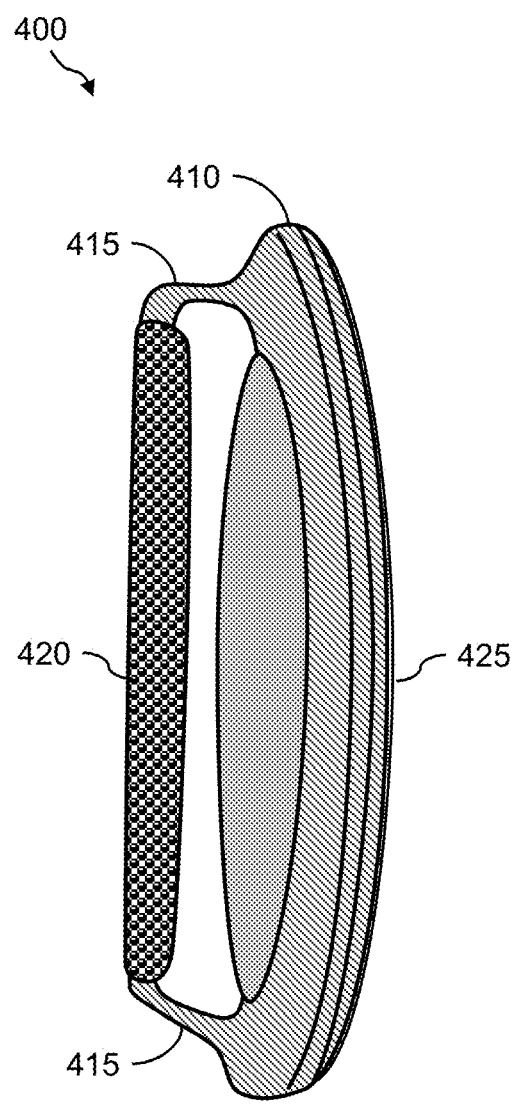
Figure 6:
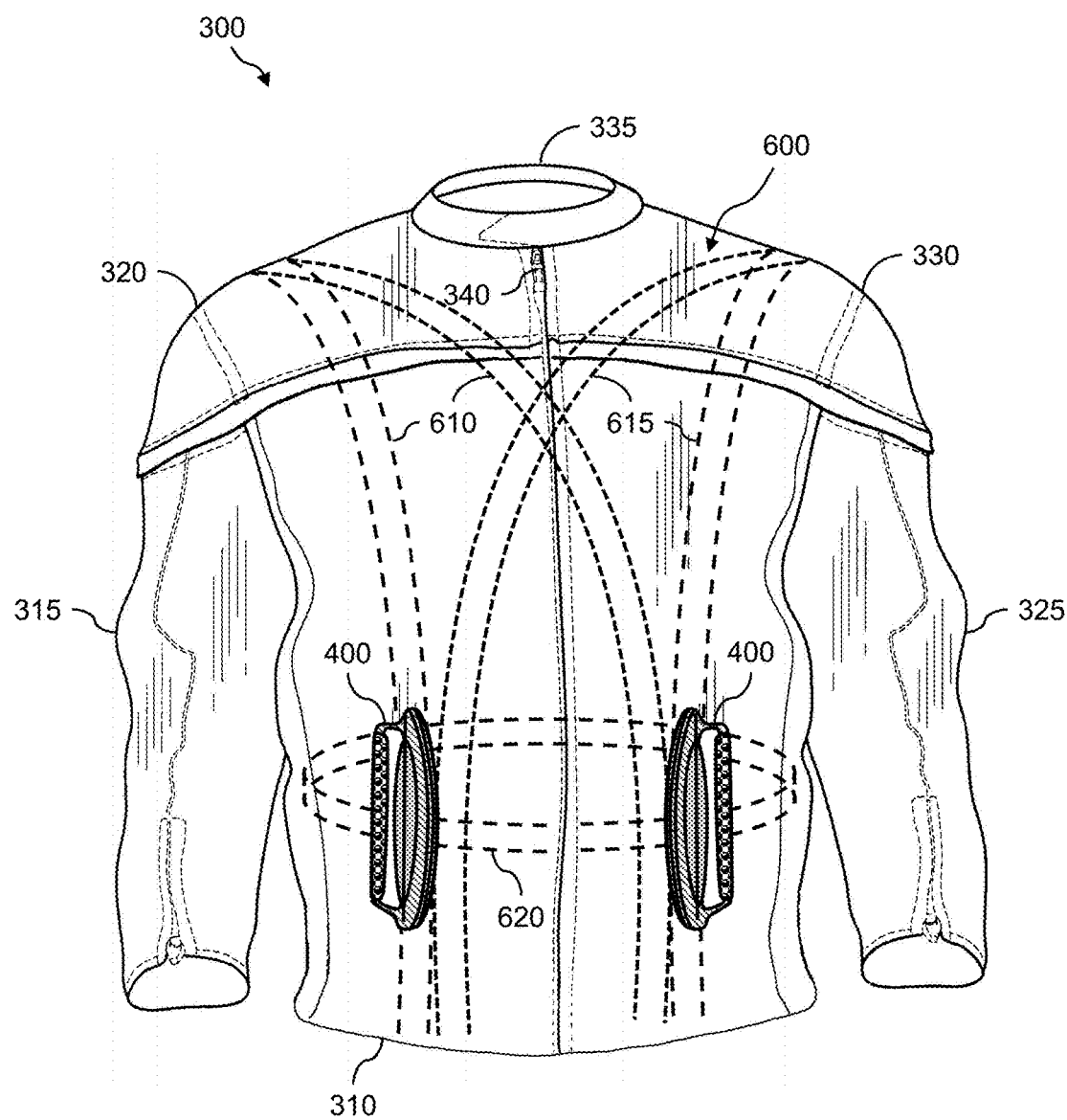
Figure 7:
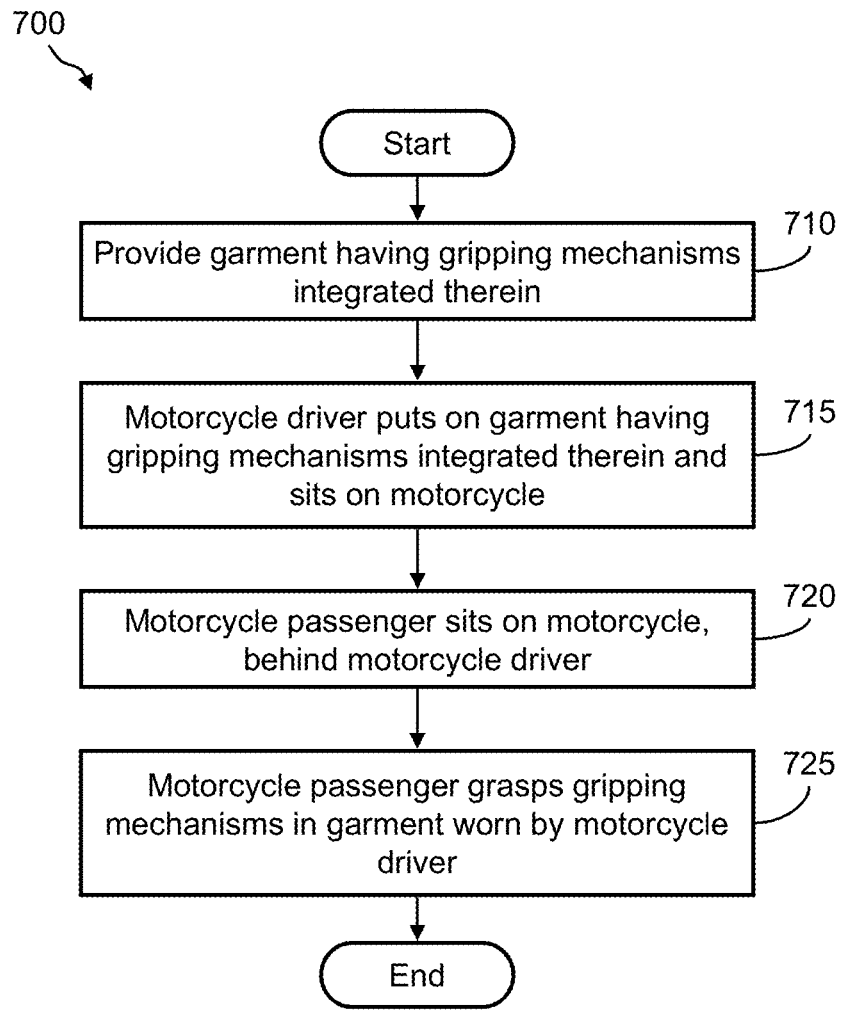

Having thus described the presently disclosed subject matter in general terms, reference will now be made to the accompanying Drawings, which are not necessarily drawn to scale, and wherein:

FIG. 1A illustrates a front view and a back view of an example of a motorcycle vest having one or more gripping mechanisms integrated therein, which is one example of the presently disclosed garments;

FIG. 1B illustrates a front view of another example of a motorcycle vest having one or more gripping mechanisms integrated therein, which is another example of the presently disclosed garments;

FIG. 2 illustrates a front view of yet another example of a motorcycle vest having one or more gripping mechanisms integrated therein, which is another example of the presently disclosed garments;

FIG. 3 illustrates a front view of an example of a motorcycle jacket having one or more gripping mechanisms integrated therein, which is yet another example of the presently disclosed garments;

FIG. 4 illustrates a front view of another example of a motorcycle jacket having one or more gripping mechanisms integrated therein, which is still another example of the presently disclosed garments;

FIG. 5 illustrates a side view of an example of a handgrip used in the motorcycle jacket shown in FIG. 4;

FIG. 6 illustrates another front view of the motorcycle jacket (with a harness built inside the jacket lining) shown in FIG. 4 and showing more details thereof; and FIG. 7 illustrates a flow diagram of an example of a method of using the presently disclosed garments having one or more gripping mechanisms integrated therein.

DETAILED DESCRIPTION

The presently disclosed subject matter now will be described more fully hereinafter with reference to the accompanying Drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

In some embodiments, the presently disclosed subject matter provides garments having one or more gripping mechanisms integrated therein, the gripping mechanisms themselves, and methods of use thereof. More particularly, the presently disclosed garments having one or more gripping mechanisms integrated therein can be any garment worn by motorcyclists, such as, but not limited to, a motorcycle vest and a motorcycle jacket.

The presently disclosed garments having one or more gripping mechanisms integrated therein are garments worn by the motorcycle driver and the one or more gripping mechanisms integrated therein are provided for motorcycle passengers to grasp when sitting behind the driver. By grasping the one or more gripping mechanisms in the garment of the motorcycle driver, the motorcycle passenger is held more securely and safely on the motorcycle as compared to the passenger merely wrapping his/her arms around the motorcycle driver's body without the gripping mechanisms.

In one embodiment, a motorcycle vest and/or motorcycle jacket is provided that includes pockets that can be grasped by the motorcycle passenger, wherein the pockets can be on the front, back, or both the front and back of the garment. The pockets included in the presently disclosed jacket or vest are inserted backward and downward relative to a normal pocket. In other words, a normal pocket is positioned so the wearer of the jacket or vest can insert their hands directly therein. The pockets of the presently disclosed jacket or vest are positioned in an opposite direction (backward and downward) so that, for example, a passenger on a motorcycle sitting behind the wearer of the jacket or vest, e.g., the driver of the motorcycle, can grasp the pocket with their hands or fingertips.

In other embodiments, a motorcycle vest and/or motorcycle jacket is provided that includes loops that can be grasped by the motorcycle passenger, wherein the loops can be on the front, back, or both the front and back of the garment. In yet other embodiments, a motorcycle vest and/or motorcycle jacket is provided that includes straps that can be grasped by the motorcycle passenger, wherein the straps can be on the front, back, or both the front and back of the garment.

In another embodiment, a motorcycle vest and/or motorcycle jacket is provided that includes handgrips that can be grasped by the motorcycle passenger, wherein the handgrips can be integrated into the front of the garment. Further, in some embodiments, the handgrips are coupled to a harness that is integrated into the motorcycle vest and/or motorcycle jacket.

Referring now to FIG. 1A is a front view and a back view of an example of a motorcycle vest 100 having handgrip pockets integrated therein, which is one example of the presently disclosed garments having gripping mechanisms integrated therein. The motorcycle vest 100 can be any standard motorcycle vest worn by motorcyclists, except that the motorcycle vest 100 includes one or more handgrip pockets 120 (inserted backward relative to a normal pocket). Namely, the motorcycle vest 100 includes a vest body 110, which is the main body of fabric (e.g., leather, nylon, silk, cotton, denim, and any other fabric suitable for a motorcycle vest or jacket) forming the motorcycle vest 100. A zipper 115 (or any other type of fastener, including, but not limited to one or more buttons, snaps, buckles, and the like) can be provided at the front of the vest body 110. The "front" meaning the front of the motorcycle vest 100 when worn by the user.

In this example, a lining 123, such as a silk lining, or a wool lining, or a lining of natural or synthetic fabric or material, such as an insulating material, is sewn into the vest body 110 of the motorcycle vest 100. One or more handgrip pockets 120 (or pocket inserts) are provided in the lining 123. For example, a pair of handgrip pockets 120 is provided at different heights on the right front side of the vest body 110. Likewise, a pair of handgrip pockets 120 is provided at different heights on the left front side of the vest body 110. Each of the handgrip pockets 120 has a slit or opening 125 that can be grasped by a person's fingertips. The two different heights are provided so that the user can select the handgrip pockets 120 that are most comfortable.

The slits or openings 125 can be reinforced with stitching. In general, natural or synthetic thread can be used to form the handgrip pockets 120 and to reinforce the slits or openings 125. In one example, the handgrip pockets 120 and the slits or openings 125 are about 4 inches wide. Further, a handgrip pocket 130 (inserted downward relative to a normal pocket) is provided in the back of the vest body 110. The handgrip pocket 130 has a slit or opening 135 that can be grasped by a person's fingertips. In one example, the handgrip pocket 130 and the slit or opening 135 is about 6 inches wide.

In operation, the motorcycle driver (not shown) puts on the motorcycle vest 100 having the handgrip pockets 120, 130 integrated therein and secures the motorcycle vest 100 using the zipper 115. The motorcycle driver sits on the motorcycle (not shown). Then, the passenger (not shown) sits on the motorcycle, behind the driver. Then, the passenger can either (1) reach his/her arms around the body of the driver and grasp with his/her fingertips the slits or openings 125 of any two handgrip pockets 120 on the front of the motorcycle vest 100, or (2) grasp with his/her fingertips the slit or opening 135 of the handgrip pocket 130 on the back of the motorcycle vest 100.

Referring now to FIG. 1B is a front view of another example of the motorcycle vest 100 having the handgrip pockets 120, 130 integrated therein, which is another example of the presently disclosed garments having gripping mechanisms integrated therein. In this example, the handgrip pockets 120 are set at an angle, perhaps providing a different comfort level for the user. The motorcycle vest 100 shown in FIG. 1B may also include the handgrip pocket 130 (not shown) on the back.

FIG. 2 illustrates a front view of yet another example of the motorcycle vest 100 having the handgrip loops 140, 145 integrated therein, which is yet another example of the presently disclosed garments having gripping mechanisms integrated therein. In this example, the handgrip loops 140 can replace the handgrip pockets 120 on the front of the motorcycle vest 100 and handgrip loop 145 can replace the handgrip pocket 130 on the back of the motorcycle vest 100. The handgrip loops 140, 145 can be loops of fabric, such as loops of leather fabric. Each of the handgrip loops 140 can be, for example, about 4 inches long and about 1 inch wide. The handgrip loop 145 can be, for example, about 6 inches long and about 1 inch wide. Again, the handgrip loops 140, 145 can be grasped by the motorcycle passenger when the driver is wearing the motorcycle vest 100 shown in FIG. 2.

Referring now to FIG. 3 is a front view of an example of a motorcycle jacket 300 having the handgrip pockets 120, 130 integrated therein, which is yet another example of the presently disclosed garments having mechanisms integrated therein. The motorcycle jacket 300 can be any standard motorcycle jacket worn by motorcyclists, except that the motorcycle vest 100 includes the one or more handgrip pockets 120. Namely, the motorcycle jacket 300 includes a jacket body 310, which is the main body of fabric (e.g., leather, nylon, silk) forming the motorcycle jacket 300. The motorcycle jacket 300 also includes a right arm 315 and a right shoulder 320, a left arm 325 and a left shoulder 330, and a collar 335. Further, a zipper 340 (or any other type of fastener) can be provided at the front of the jacket body 310. The "front" meaning the front of the motorcycle jacket 300 when worn by the user.

In this example, the handgrip pockets 120 are provided at the front of the motorcycle jacket 300, as described with reference to the motorcycle vest 100 shown in FIG. 1A, FIG. 1B, and FIG. 2. The motorcycle jacket 300 may also include the handgrip pocket 130 (not shown) on the back. Like the motorcycle vest 100 shown in FIG. 1A, FIG. 1B, and FIG. 2, a lining 123, such as a silk lining, is sewn into the jacket body 310 of the motorcycle jacket 300. The handgrip pockets 120 and the handgrip pocket 130 are provided in the lining 123.

Referring now to FIG. 4 is a front view of another example of the motorcycle jacket 300 having handgrips 400 integrated therein, which is still another example of the presently disclosed garments having mechanisms integrated therein. In this example, a pair of handgrips 400 is provided on the front of the motorcycle jacket 300 in place of the handgrip pockets 120. Namely, one handgrip 400 is provided on the right side and another handgrip 400 is provided on the left side. The handgrips 400 are coupled to a harness (see FIG. 6) that is integrated into the lining 123 of the motorcycle jacket 300, wherein the harness (see FIG. 6) provides reinforcement and strength.

Referring now to FIG. 5 is a side view of an example of the handgrip 400 used in the motorcycle jacket 300 shown in FIG. 4. In this example, the handgrip 400 includes a baseplate 410, a handle 415 that protrudes from the baseplate 410, and a padded grip 420 around the handle 415. The baseplate 410 and the handle 415 can be formed of any lightweight, rigid, strong material, such as molded plastic or metal (e.g., aluminum, stainless steel). The padded grip 420 can be, for example, a cotton grip.

When not in use, the handle 415 of the handgrip 400 can collapse down and be hidden inside the motorcycle jacket 300, whereas when in use, the handle 415 of the handgrip 400 is pulled up and exposed. Namely, the handle 415 of the handgrip 400 can collapse or be exposed via a slit 350 in the front of the jacket body 310.

The baseplate 410 can have an elongated ovular footprint. In one example, the overall length of the handgrip 400 is about 4 inches. Further, the space between the padded grip 420 and the baseplate 410 can be any distance that allows the user to easily and comfortably grasp the padded grip 420 with his/her fingers. Further, a back surface 425 of the baseplate 410 can be used for fastening to the harness (see FIG. 6). For example, the back surface 425 of the baseplate 410 of the handgrip 400 can be riveted, adhered, sewn, and/or fused to the harness (see FIG. 6). More details of how the pair of handgrip 400 are installed in the motorcycle jacket 300 are shown and described herein below with reference to FIG. 6.

Referring now to FIG. 6 is another front view of the motorcycle jacket 300 shown in FIG. 4 and showing more details thereof. Namely, the motorcycle jacket 300 further includes a harness 600 to which the pair of handgrip 400 are fastened. In one example, the harness 600 is integrated into the lining (not shown) of the motorcycle jacket 300. The harness 600 includes, for example, a strap 610 that runs substantially vertically up the front right side of the motorcycle jacket 300, then over the right shoulder 320, and then down the back of the motorcycle jacket 300 in a crossing fashion. Similarly, the harness 600 includes a strap 615 that runs substantially vertically up the front left side of the motorcycle jacket 300, then over the left shoulder 330, and then down the back of the motorcycle jacket 300 in a crossing fashion. Namely, on the back of the motorcycle jacket 300, the strap 610 and the strap 615 cross. Further, a center strap 620 wraps around the "torso" of the motorcycle jacket 300, tying together the back and front ends of the strap 610 and the strap 615. The straps of the harness 600 can be formed, for example, of nylon, polymers, cotton, string metal, natural fibers, bamboo, hemp, and composites of the same in various and different combinations. For each of the handgrips 400, the back surface 425 of the baseplate 410 can be riveted, adhered, sewn, fused, or attached in any other way to the strap 610 or the strap 615 of the harness 600.

In operation, the motorcycle driver (not shown) puts on the motorcycle jacket 300 shown in FIG. 4 and FIG. 6 having the handgrips 400 integrated therein and secures the motorcycle jacket 300 using the zipper 340. The motorcycle driver sits on the motorcycle (not shown). Then, the passenger (not shown) sits on the motorcycle, behind the driver. Then, the passenger reaches his/her arms around the body of the driver and grasps with his/her fingertips the two handgrips 400 on the front of the motorcycle jacket 300.

Referring now to FIG. 1A through FIG. 6, the presently disclosed garments having mechanisms integrated therein can be, for example, a motorcycle vest or a motorcycle jacket that includes any configuration of a harness, one or more handgrip pockets 120, 130, one or more handgrip loops 140, 145, one or more handgrips 400, or any combinations thereof. For example, the motorcycle vests 100 shown in FIG. 1A, FIG. 1B, and FIG. 2 may include the harness 600 and the two handgrips 400 instead of the handgrip pockets 120, 130. Further, the number and positions of the handgrip pockets 120, 130, handgrip loops 140, 145, and/or the handgrips 400 can vary. For example, a handgrip 400 can be provided on the back of the motorcycle vest 100 or the motorcycle jacket 300.

Referring now to FIG. 7 is a flow diagram of an example of a method 700 of using the presently disclosed garments having mechanisms integrated therein. The method 700 may include, but is not limited to, the following steps.

At a step 710, a garment having gripping mechanisms integrated therein is provided. In one example, the motorcycle vest 100 shown in FIG. 1A or FIG. 1B that includes the handgrip pockets 120, 130 is provided. In another example, the motorcycle jacket 300 shown in FIG. 4 and FIG. 6 that includes the handgrips 400 and the harness 600 is provided.

At a step 715, the motorcycle driver puts on the garment having the gripping mechanisms integrated therein and sits on the motorcycle. For example, the motorcycle driver puts on the motorcycle vest 100 shown in FIG. 1A or FIG. 1B or the motorcycle driver puts on the motorcycle jacket 300 shown in FIG. 4 and FIG. 6.

At a step 720, the motorcycle passenger sits on the motorcycle, behind the motorcycle driver.

At a step 725, the motorcycle passenger grasps the gripping mechanisms in the garment worn by the motorcycle driver. In one example, the motorcycle passenger reaches around the body of the driver and grasps the handgrip pockets 120, 130 of the motorcycle vest 100 shown in FIG. 1A or FIG. 1B. In one example, the motorcycle passenger reaches around the body of the driver and grasps the handgrips 400 of the motorcycle jacket 300 shown in FIG. 4 and FIG. 6.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments, ±100% in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

That which is claimed:

1. A jacket or a vest having one or more gripping mechanisms integrated therein, the jacket or vest comprising a jacket or vest body and one or more gripping mechanisms comprising one or more of pockets, a loop, and a handgrip provided on one or more of a front and a back of the jacket or vest body, wherein at least two of the pockets are disposed on the front of the jacket or vest body and are each orientated at a downward angle relative to horizontal, such that an opening of each of the at least two pockets is facing at a downward angle relative to horizontal and in a direction of a front vertical centerline of the jacket or vest body when the jacket or vest body is in a fastened position, wherein at least a first one of the at least two pockets is disposed on a front left side of the jacket or vest body relative to the front vertical centerline when the jacket or vest body is in a fastened position and a second one of the at least two pockets is disposed on a front right side of the jacket or vest body relative to the front vertical centerline when the jacket or vest body is in a fastened position, and wherein the at least first one and second one of the at least two pockets are positioned at substantially the same vertical height and further wherein the opening of the at least two pockets are disposed on an outside surface of the jacket or vest and are configured such that a passenger sitting behind a driver on a motorcycle reaching his/her arms around a body of the driver can grasp the opening of the at least two pockets with his/her fingers; and wherein the jacket or vest further comprises a third pocket disposed on an upper center portion of the back of the jacket or vest.

2. The jacket or vest of claim 1, wherein one or more of the pockets comprise a slit or opening integrated with a lining of the jacket or vest to form a pocket insert.

3. The jacket or vest of claim 1, wherein the one or more gripping mechanisms further comprise one or more loops adapted to be grasped by a person's fingers.

4. The jacket or vest of claim 1, wherein the one or more gripping mechanisms further comprise one or more handgrips.

5. The jacket or vest of claim 4, wherein the one or more handgrips are attached directly to the jacket or vest.

6. The jacket or vest of claim 4, wherein the one or more handgrips are concealed in one or more pocket inserts.

7. The jacket or vest of claim 4, wherein the one or more handgrips comprise a baseplate, a handle that protrudes from the baseplate, and a padded grip around the handle.

8. The jacket or vest of claim 4, wherein the one or more handgrips are coupled to a harness, wherein the harness is integrated into a lining of the jacket or vest.

9. The jacket or vest of claim 8, wherein the harness comprises a first strap that runs substantially vertically up a front right side of the jacket or vest, then over a right shoulder of the jacket or vest and then down the back of the jacket or vest in a crossing fashion, a second strap that runs substantially vertically up a front left side of the jacket or vest, then over a left shoulder of the jacket or vest and then down the back of the jacket or vest in a crossing fashion, and a center strap that wraps around the body of the jacket or vest, thereby tying together a back end and a front end of the first strap and the second strap.

10. A jacket or a vest having one or more-gripping mechanisms integrated therein, the jacket or vest comprising a jacket or vest body and one or more gripping mechanisms comprising one or more of a pockets, a loop, and a handgrip provided on one or more of a front and a back of the jacket or vest body, wherein at least four of the pockets are disposed on the front of the jacket or vest body and are each orientated at a downward angle relative to horizontal, such that an opening of each of the at least four pockets is facing at a downward angle relative to horizontal and in a direction of a front vertical centerline of the jacket or vest body when the jacket or vest body is in a fastened position, wherein at least a first one and second one of the at least four pockets are disposed one above the other on a front left side of the jacket or vest body relative to the front vertical centerline when the jacket or vest body is in a fastened position, and a third one and a fourth one of the at least four pockets are disposed one above the other on a front right side of the jacket or vest body relative to the front vertical centerline when the jacket or vest body is in a fastened position, and wherein the first one and third one of the at least four pockets are positioned at substantially the same vertical height on the front of the jacket or vest body and the second one and the fourth one of the at least four pockets are positioned at substantially the same vertical height on the front of the jacket or vest body, and further wherein the openings of the at least four pockets are disposed on an outside surface of the jacket or vest and are configured such that a passenger sitting behind a driver on a motorcycle reaching his/her arms around a body of the driver can grasp one or more of the openings of the at least four pockets with his/her fingers; and wherein the jacket or vest further comprises a fifth pocket disposed on an upper center portion of the back of the jacket or vest.

* * * * *